US008049934B2

(12) United States Patent
Oshima

(10) Patent No.: US 8,049,934 B2
(45) Date of Patent: Nov. 1, 2011

(54) COMMUNICATION TERMINAL DEVICE FOR MANAGING PRINT MEDIA

(75) Inventor: Osamu Oshima, Kyoto (JP)

(73) Assignee: Murata Kikai Kabushiki Kaisha, Kyoto-shi, Kyoto (JP)

(*) Notice: Subject to any disclaimer, the term of this patent is extended or adjusted under 35 U.S.C. 154(b) by 1224 days.

(21) Appl. No.: 11/790,325

(22) Filed: Apr. 25, 2007

(65) Prior Publication Data

US 2007/0253022 A1 Nov. 1, 2007

(30) Foreign Application Priority Data

Apr. 28, 2006 (JP) ................. 2006-125073

(51) Int. Cl.
*H04N 1/40* (2006.01)
*G06F 3/12* (2006.01)
*G06F 17/00* (2006.01)
(52) U.S. Cl. ............. 358/3.28; 358/1.15; 235/375
(58) Field of Classification Search .......... 358/1.15, 358/1.14, 1.16, 1.13, 3.28; 399/366; 365/192; 235/375; 705/41
See application file for complete search history.

(56) References Cited

U.S. PATENT DOCUMENTS

| 2002/0114013 | A1* | 8/2002 | Hyakutake et al. | 358/3.28 |
| 2002/0170973 | A1* | 11/2002 | Teraura | 235/492 |
| 2005/0023355 | A1* | 2/2005 | Barrus | 235/462.15 |
| 2005/0029353 | A1* | 2/2005 | Isemura et al. | 235/454 |
| 2005/0209980 | A1* | 9/2005 | Ishii et al. | 705/406 |
| 2006/0071063 | A1* | 4/2006 | Duckett | 235/375 |
| 2006/0132816 | A1* | 6/2006 | Yamamoto et al. | 358/1.13 |

FOREIGN PATENT DOCUMENTS

| JP | 2002-337426 A | 11/2002 |
| JP | 2004-142419 A | 5/2004 |
| JP | 2005-028673 A | 2/2005 |
| JP | 2005-031153 A | 2/2005 |
| JP | 2005-151357 A | 6/2005 |
| JP | 2005-161769 A | 6/2005 |
| JP | 2005305662 1 | 11/2005 |
| JP | 2006-007674 A | 1/2006 |

OTHER PUBLICATIONS

Japanese Office Action dated May 13, 2008, issued in corresponding Japanese Patent Application No. 2006-125073.

* cited by examiner

*Primary Examiner* — Thomas Lett
(74) *Attorney, Agent, or Firm* — Westerman, Hattori, Daniels & Adrian, LLP

(57) ABSTRACT

A communication terminal device includes a receiving unit, a printer unit, a selection registering unit, an extracting unit, and a determining unit. The receiving unit receives data. The printer unit prints an image onto printing paper according to the data received by the receiving unit. The selection registering unit registers a selection of whether or not to attach a storage medium, in which information can be electronically written, to the printing paper and to output the printing paper, by associating the selection with prescribed information. The extracting unit extracts the prescribed information from the data received by the receiving unit or data acquired in relation with transmission and reception of the data. The determining unit determines whether or not to attach the storage medium to the printing paper according to the selection registered in the selection registering unit by being associated with the prescribed information extracted by the extracting unit.

20 Claims, 9 Drawing Sheets

FIG. 4

SELECTION INFORMATION RESISTER TABLE T1

| TRANSMITTER INFORMATION | SELECTION INFORMATION |
|---|---|
| 075-123-4567 | TAG NECESSARY |
| 075-234-5678 | TAG UNNECESSARY |
| 075-345-6789 | TAG NECESSARY |
| 075-456-7890 | TAG NECESSARY |
| abc@123.com | TAG NECESSARY |
| abc@234.com | TAG NECESSARY |
| abc@345.com | TAG NECESSARY |
| abc@456.com | TAG UNNECESSARY |

FIG. 5

WRITING INFORMATION RESISTER TABLE T2

| TRANSMITTER INFORMATION | WRITING INFORMATION | | |
|---|---|---|---|
| | TRANSMITTER NAME INFORMATION | USAGE SPECIFYING INFORMATION | TRANSMISSION DESTINATION INFORMATION |
| 075-123-4567 | DEVELOPMENT DEPT. | COPY PROHIBITED | - |
| 075-345-6789 | SALES DEPT. | INTERNAL USE ONLY | - |
| 075-456-7890 | AAA TRADING | - | 075-345-6789 |
| abc@123.com | DEVELOPMENT DEPT. | COPY PROHIBITED | - |
| abc@234.com | SALES DEPT. | INTERNAL USE ONLY | - |
| bcd@111.com | AAA TRADING | - | abc@234.com |

COMMUNICATION TERMINAL DEVICE FOR MANAGING PRINT MEDIA

BACKGROUND OF THE INVENTION

1. Field of the Invention

The present invention relates to a communication terminal device, and more particularly to a communication terminal device for printing an image based on received data onto a printing paper.

2. Description of the Related Art

A storage medium in which various pieces of information are electronically written is attached to a printing paper on which an image has been printed to reliably carry out an appropriate usage or management of the printing paper according to information retrieved from the storage medium. Recently, a proposal has been made for using an Integrated Circuit (IC) chip of a Radio Frequency-Identification (RFID) tag as such a storage medium. Further, information stored in the RFID tag is retrieved by wireless communication.

For example, when information to be written into an RFID tag is included in received data, a known printer or the like prints an image based on the received data onto a printing paper fed from a tray accommodating printing papers with an RFID tag, and writes information included in the received data into the RFID tag of the printing paper.

When copying an image of an original document attached with an RFID tag, a known image forming device switches whether or not to attach an RFID tag to a printing paper without an RFID tag according to an operation from an operation unit. Management information, such as an image original storage address, level of importance, a copyright holder and printed date and time, relating to the image printed on the printing paper is written into the RFID tag.

However, according to the known printer or the like, when information that should be written into the RFID tag is included in the received data, such information is directly written into the RFID tag attached to the printing paper. Therefore, there has existed a problem, for example, that prescribed information cannot be written automatically into the RFID tag according to a transmitter of the received data. Alternatively, there has existed a problem that a selection cannot be made as to whether or not to print an image on a printing paper with an RFID tag. Furthermore, when the received data is not data or the like transmitted from a Personal Computer (PC), for example, when the received data has been transmitted through a normal facsimile transmission, information that is necessary to be written into the RFID tag cannot be included in the data. Therefore, in such a case, there has existed a problem that information necessary for an appropriate usage or management of the printing paper cannot be written into the RFID tag of the printing paper on which an image is to be printed.

According to the above-described image forming device, information written in an RFID tag attached to an original document and information relating to date and time of printing are just written into the RFID tag attached to the printing paper. Therefore, there has existed a problem that information other than the information retrieved from the RFID tag, for example, the received data, cannot be written into the RFID tag to be attached to the printing paper. Moreover, since a printing paper is required to be selected by an operation from an operation unit, when printing received data onto the printing paper, for example, there has existed a problem that a selection cannot be made appropriately as to whether or not to attach an RFID tag, for example, a selection cannot be switched automatically according to a transmitter of the data.

SUMMARY OF THE INVENTION

In order to overcome the problems described above, preferred embodiments of the present invention provide a communication terminal device for printing an image based on received data onto a printing paper, i.e., a communication terminal device capable of reliably carrying out an appropriate usage and management of a printing paper on which an image has been printed according to the received data.

According to an aspect of the present invention, a communication terminal device includes a receiving unit, a printer unit, a selection registering unit, an extracting unit, and a determining unit. The receiving unit receives data. The printer unit prints an image based on the data received by the receiving unit onto a printing paper. The selection registering unit registers a selection of whether or not to attach a storage medium, in which information can be electronically written, to a printing paper and to output such a printing paper, by associating the selection with prescribed information. The extracting unit extracts the prescribed information from the data received by the receiving unit or data acquired in relation with transmission or reception of the data. The determining unit determines whether or not to attach the storage medium to the printing paper to be printed out according to the selection registered in the selection registering unit by being associated with the prescribed information extracted by the extracting unit.

Accordingly, even when data directly indicating selection is not included in the received data, in accordance with the prescribed information extracted by the extracting unit from the received data or the data acquired in relation with the transmission or the reception of the data, a determination can be made as to whether or not to attach a storage medium to the printing paper on which an image based on the received data is to be printed, and to output such a printing paper. Therefore, when the extracting unit extracts prescribed information, a storage medium can be reliably attached to the printing paper on which an image relating to the data has been printed, and such a printing paper can be output. As a result, an appropriate usage or management can be reliably carried out with respect to the printing paper. Furthermore, by associating the prescribed information and the selection and registering the prescribed information and the selection in the selection registering unit, a determination can be made as to whether or not to attach the storage medium. Therefore, by appropriately associating prescribed information and the selection and registering the prescribed information and the selection in the selection registering unit, a determination can be made appropriately on whether or not to attach the storage medium, and the determination can be changed easily. Further, a device other than the communication terminal device of the present invention can also write information into a storage medium to be attached to a printing paper.

As one preferred embodiment, the receiving unit receives facsimile data.

In general, facsimile data does not include information directly indicating a selection on whether or not to attach a storage medium to a printing paper on which an image based on facsimile data has been printed and to output such a printing paper. However, according to the communication terminal device of the present invention, in accordance with the prescribed information extracted by the extracting unit from the data acquired in relation with the transmission or the reception of the facsimile data, for example, in accordance with transmitter information included in the facsimile data, or nonstandard information used for setting a nonstandard function, a determination can be made as to whether or not to attach a storage medium to a printing paper on which an image based on facsimile data has been printed and to output such a printing paper. Therefore, a storage medium can be reliably attached to a printing paper on which an image has been printed according to the facsimile data from which the extracting unit has extracted the prescribed information, and such a printing paper can be output. As a result, an appropriate usage and management can be reliably carried out with respect to the printing paper.

For example, the prescribed information may be transmitter information indicating a transmitter of the data received by the receiving unit.

Accordingly, a storage medium can be reliably attached to the printing paper on which an image has been printed according to the data received from a specific transmitter, and such printing paper can be output. As a result, an appropriate usage or management can be carried out reliably with respect to the printing paper according to the transmitter. Moreover, the transmitter information is included in the facsimile data received by the receiving unit. Therefore, even when receiving facsimile data, with respect to the printing paper on which an image based on the facsimile data has been printed, an appropriate usage or management can be carried out reliably according to the transmitter.

According to another aspect of the present invention, the communication terminal device can further include a selection accepting unit for accepting the selection. The determining unit preferentially determines the selection accepted by the selection accepting unit.

Accordingly, according to the selection accepted by the selection accepting unit, a storage medium can be attached to the printing paper on which the image based on the received data has been printed, and such a printing paper can be output. As a result, an appropriate usage or management can be reliably carried out with respect to the printing paper according to a demand from outside of the communication terminal device.

According to another aspect of the present invention, the communication terminal device further includes a presenting unit for presenting information extracted by the extracting unit from the data received by the receiving unit, data acquired in relation with the transmission or the reception of the data, or from both of such data. By referring to the data or the information presented by the presenting unit, an operator can enter a selection to the selection accepting unit.

According to another aspect of the present invention, the communication terminal device further includes a writing unit for writing information into the storage medium.

Accordingly, information relating to an appropriate usage or management or the like of the printing paper can be reliably written into the storage medium to be attached to the printing paper on which an image based on the received data has been printed. As a result, an appropriate usage or management or the like with respect to the printing paper can be reliably carried out. Further, information to be written into the storage medium by the writing unit may be information entered from outside of the communication terminal device.

According to another aspect of the present invention, the writing unit can write information extracted from the data received by the receiving unit or the data acquired in relation with the transmission or the reception of the data into the storage medium.

Accordingly, information extracted from the received data or the like can be reliably and automatically written directly into the storage medium to be attached to the printing paper on which an image has been printed according to the received data. As a result, an appropriate usage or management or the like with respect to the printing paper can be reliably carried out.

According to another aspect of the present invention, the communication terminal device can further include a generating unit for generating information relating to specification of usage of the printing paper on which the image has been printed, according to the information extracted by the extracting unit. The writing unit writes the information generated by the generating unit into the storage medium.

Accordingly, even when the information relating to the specification of the usage of the printing paper cannot be extracted, the generating unit generates the information relating to the specification of the usage of the printing paper according to the prescribed information extracted by the extracting unit. Therefore, information relating to the specification of the usage of the printing paper can be reliably and automatically written into the storage medium to be attached to the printing paper on which an image has been printed according to the received data. As a result, an appropriate usage of the printing paper can be reliably carried out.

According to another aspect of the present invention, the communication terminal device further includes a paper with a storage medium feeding unit for feeding a printing paper attached with a storage medium, in which information can be electronically written, and a paper without a storage medium feeding unit for feeding a printing paper not attached with a storage medium, in which information can be electronically written. In accordance with the determination made by the determining unit, the paper with the storage medium feeding unit or the paper without the storage medium feeding unit feeds a printing paper to the printer unit.

Accordingly, since the communication terminal device is not required to be provided with an attaching unit for attaching a storage medium to a printing paper, the costs of the communication terminal device can be reduced.

According to another aspect of the present invention, the communication terminal device further includes a paper without a storage medium feeding unit for feeding a printing paper not attached with a storage medium, in which information can be electronically written, and an attaching unit for attaching a storage medium, in which information can be electronically written, to the printing paper. When the determining unit determines to attach a storage medium, the attaching unit attaches the storage medium to the printing paper fed from the paper without the storage medium feeding unit.

Accordingly, the communication terminal device is not required to be provided with a feeding unit for feeding a printing paper attached with a storage medium to the printer unit. Therefore, costs and capacity of the communication terminal device can be reduced.

According to another aspect of the present invention, the communication terminal device further includes an indication adding unit for adding an indication, which indicates that a storage medium is attached, to a printing paper when the determining unit determines that the storage medium is attached.

Accordingly, a fact that whether or not a storage medium is attached to a printing paper on which an image based on the received data has been printed can easily be distinguished according to a presence or an absence of an indication. Therefore, an appropriate usage or management with respect to the printing paper attached with the storage medium can be urged.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4 illustrates an example of a selection information register table according to the first preferred embodiment of the present invention.

FIG. 5 illustrates an example of a writing information register table according to the first preferred embodiment of the present invention.

DETAILED DESCRIPTION OF PREFERRED EMBODIMENTS

Figure 1:
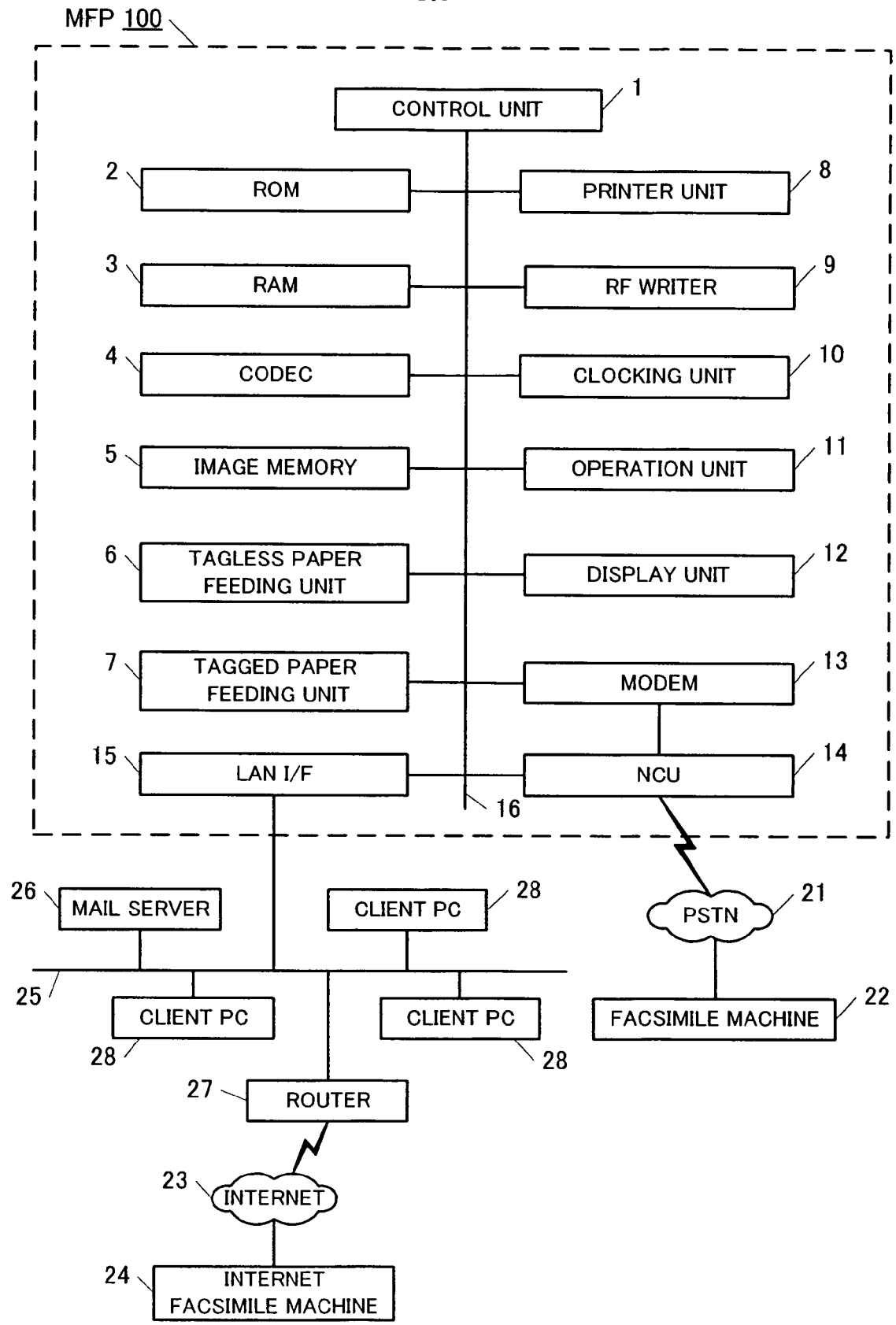
FIG. 1 is a block diagram illustrating an example of a configuration of a Multi Function Peripheral (MFP) according to a first preferred embodiment of the present invention.

With reference to the drawings, a description will be made of an MFP 100 including a communication terminal device according to a first preferred embodiment of the present invention. As illustrating in the block diagram of FIG. 1, the MFP 100 includes a Central Processing Unit (CPU) 1, a Read Only Memory (ROM) 2, a Random Access Memory (RAM) 3, a Coder and Decoder (CODEC) 4, an image memory 5, a tagless paper feeding unit (paper without a storage medium feeding unit) 6, a tagged paper feeding unit (paper with a storage medium feeding unit) 7, a printer unit 8, a Radio Frequency (RF) writer (writing unit) 9, a clocking unit 10, an operation unit 11, a display unit 12, a Modulator-Demodulator (MODEM) 13, a Network Control Unit (NCU) 14, and a Local Area Network Interface (LAN I/F) 15. Each of the units 1 through 15 is connected via a bus 16 in a manner that communication can be carried out.

The above-described MFP 100 includes a function for receiving data transmitted from another device. Specifically, the MFP 100 includes a facsimile receiving function for receiving data from a facsimile machine 22, which is connected to the MFP 100 via a Public Switched Telephone Network (PSTN) 21 in a manner that communication can be carried out. The MFP 100 also includes an electronic mail receiving function for receiving an electronic mail to which image data is attached as an image file from an Internet facsimile machine 24, which is connected to the MFP 100 via the Internet 23 in a manner that communication can be carried out. The MFP 100 also includes a printing function for printing an image on printing paper according to received data and outputting the printed printing paper. Further, although not illustrated in the drawings, the MFP 100 also includes a scanner function for scanning an image of an original document placed on a Flat Bed Scanner (FBS), and an image of an original document transported from a document tray by an Auto Document Feeder (ADF). The MFP 100 also includes a copier function for printing a scanned image of an original document and outputting the printed printing paper. The MFP 100 also includes a facsimile data transmitting function for transmitting image data obtained by scanning an image of an original document to the facsimile machine 22 via the PSTN 21. The MFP 100 also includes an electronic mail transmitting function for transmitting electronic mail to which image data obtained by scanning an image of an original document is attached as an image file to the Internet facsimile machine 24 via the Internet 23.

The control unit 1 controls an operation of each of the units of the MFP 100. The ROM 2 stores various programs for controlling the operation of each of the units of the MFP 100 by the control unit 1. The RAM 3 functions as a main memory and a working area or the like of the control unit 1. The RAM 3 stores various data relating to the received image data, and various pieces of information to be used in a processing operation carried out by each of the units of the MFP 100 under a readable and writable state. The RAM 3 also stores a selection information register table T1 and a writing information register table T2 (refer to FIG. 4 and FIG. 5).

The CODEC 4 encodes and decodes image data. In the present preferred embodiment, the CODEC 4 decodes encoded image data received by facsimile, for example. The CODEC 4 decodes the image data by a decoding scheme according to coding scheme information or the like attached to the received image data.

The image memory 5 stores image data such as image data received by facsimile, image data received by electronic mail, and image data encoded by the CODEC 4.

The tagless paper feeding unit 6 feeds a printing paper not attached with an RFID tag (hereinafter referred to as "tagless paper") to the printer unit 8. The tagged paper feeding unit 7 feeds a printing paper attached with an RFID tag (hereinafter referred to as "tagged paper") to the printer unit 8. Although not illustrated in the drawings, an RFID tag includes an ultra compact IC chip and a coil antenna for wireless communication, and an IC chip includes a storage portion (storage medium), a power source rectification portion, a transmitting portion, and a receiving portion or the like.

Figure 2:
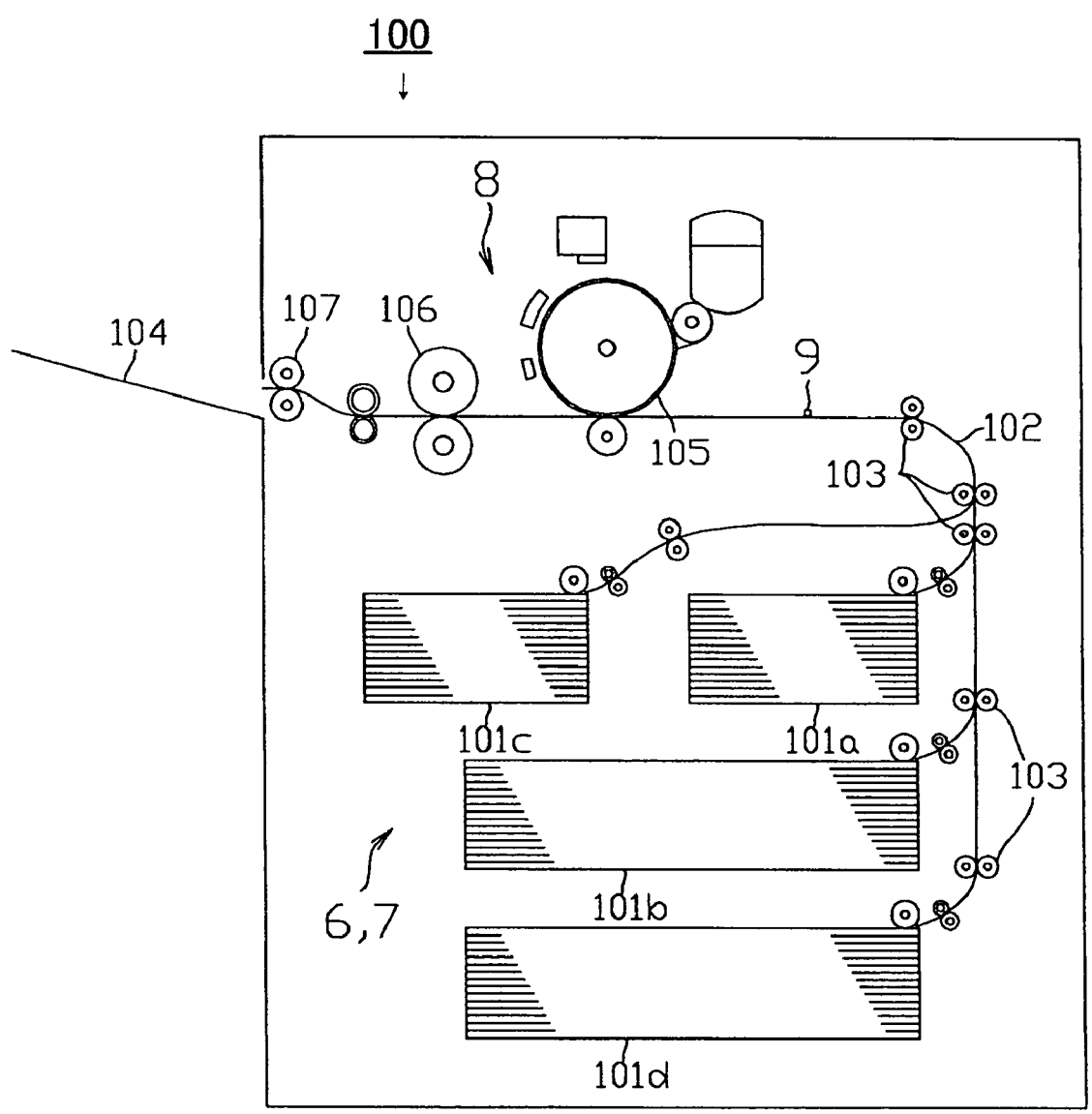
FIG. 2 is a schematic cross-sectional view of an upper portion of the MFP according to the first preferred embodiment of the present invention.

As illustrated in FIG. 2, the MFP 100 includes a plurality of paper feeding cassettes 101a through 101d capable of accommodating printing papers of various sizes in a manner that the paper feeding cassettes 101a through 101d can be drawn out. According to necessity, printing papers can be supplied to the paper feeding cassettes 101a through 101d. Each of the paper feeding cassettes 101a through 101d respectively stores printing papers of a prescribed size. An uppermost printing paper located at a paper feeding position is picked up by a pickup roller, and the picked-up printing paper is nipped by a pair of paper feeding rollers and fed into a transportation path 102 leading to the printer unit 8. Each of such paper feeding cassettes 101a through 101d respectively accommodates tagged papers or tagless papers of a prescribed size. For example, the paper feeding cassette 101a accommodates A4-sized tagless papers, the paper feeding cassette 101b accommodates A3-sized tagless papers, the paper feeding cassette 101c accommodates A4-sized tagged papers, and the paper feeding cassette 101d accommodates A3-sized tagged papers. The printing paper fed into the transportation path 102 from each of the paper feeding cassettes 101a through 101d is transported along the transportation path 102 by a plurality of transportation rollers 103 and fed to the printer unit 8. The transportation path 102 is formed extending from one end of each of the paper feeding cassettes 101a through 101d and leading to the printer unit 8, and then leading to a paper output tray 104.

In such an MFP 100, the tagless paper feeding unit 6 includes the paper feeding cassettes 101a and 101b accommodating tagless papers, pickup rollers and paper feeding rollers for the paper feeding cassettes 101a and 101b, and a portion of the transportation path 102 and transportation rollers 103 or the like. The tagless paper feeding unit 6 picks up tagless papers from the paper feeding cassette 101a or 101b to feed a prescribed sized tagless paper to the printer unit 8. Meanwhile, the tagged paper feeding unit 7 includes the paper feeding cassettes 101c and 101d accommodating tagged papers, pickup rollers and paper feeding rollers for the paper feeding cassettes 101c and 10d, and a portion of the transportation path 102 and the transportation rollers 103 or the like. The tagged paper feeding unit 7 picks up tagged papers from the paper feeding cassette 101c or 101d to feed a prescribed sized tagged paper to the printer unit 8.

The printer unit 8 prints an image onto a printing paper according to image data retrieved from the image memory 5. The printer unit 8 prints an image onto a tagless paper fed by the tagless paper feeding unit 6 or a tagged paper fed by the tagged paper feeding unit 7. As illustrated in FIG. 2, the printer unit 8 includes a photoconductive drum 105, and a charging device, a Light Emitting Diode (LED) head, a developing unit, a transfer roller, and a cleaning unit arranged around the photoconductive drum 105, and a fixing unit 106 or the like arranged at the transportation path 102 downstream of the photoconductive drum 105.

The photoconductive drum 105 is driven and rotated. The surface of the photoconductive drum 105 is charged to a prescribed voltage by a charging device, and selectively exposed by the LED head according to image data. Accordingly, an electrostatic latent image is formed on the surface of the photoconductive drum 105. The developing unit develops the electrostatic latent image formed on the surface of the photoconductive drum 105, and a toner image is formed. The toner image formed on the surface of the photoconductive drum 105 is transferred onto printing paper by the transfer roller. The toner or the like remaining on the surface of the photoconductive drum 105 is removed by the cleaning unit. The fixing unit 106 heats and presses the toner image transferred on the printing paper transported through the transportation path 102 to fix the toner image. Further, a printing method of the printer unit 8 is not limited to an electrophotographic printing method, and various other printing methods can be adopted. For example, the printer unit 8 may use an inkjet printing method or the like. After an image is printed on the printing paper by the printer unit 8, the printing paper is transported along the transportation path 102 to a discharge roller 107, and output onto the paper output tray 104.

The RF writer 9 writes information into the storage portion of the RFID tag by wireless communication. When the RFID tag receives a radiowave oscillated by the RF writer 9, an electromotive force generates within the RFID tag by a resonance effect, and the RFID tag writes information received by the generated electromotive force into the storage portion.

The clocking unit 10 manages current year, month, date and time. According to a request of the control unit 1, the clocking unit 10 provides date and time information indicating current year, month, date and time.

The operation unit 11 includes various operation keys working together with the display unit 12. For example, the operation unit 11 includes a start key for instructing to start copying, transmission or the like of an original document, a ten-key numeric pad for entering a number of copies and a transmission destination number or the like, and a cursor key and a button key or the like for entering various setting. The display unit 12 includes a Liquid Crystal Display (LCD) or the like for displaying various display screens and an operation status or the like of the MFP 100 by using characters and/or figures or the like. Further, the LCD is a touch-screen, and a user may carry out various operations by touching the screen of the LCD instead of operating the operation unit 11.

The MODEM 13 modulates and demodulates transmission data and received data according to the International Telecommunication Union-Telecommunications (ITU-T) recommendation V.34 standard or anything similar to this. The NCU 14 is a network control device for making a call or terminating a call by controlling a telephone line. The NCU 14 is connected to the facsimile machine 22 via the PSTN 21 in a manner that communication can be carried out.

The LAN I/F 15 connects a LAN 25 and the MFP 100 in a manner that communication can be carried out. A mail server 26 and a router 27 are connected to the LAN 25. The Internet facsimile machine 24 is connected to the LAN 25 via the router 27 and the Internet 23. A plurality of client Personal Computers (PCs) 28 are connected to the LAN 25. Each of the client PCs 28 can use various functions of the MFP 100. Further, the client PCs 28 respectively include a display unit for visibly displaying image data, and an entering unit for entering information.

The facsimile machine 22 transmits data including image data and transmission and reception information (hereinafter collectively referred to as "facsimile data") to the MFP 100. Specifically, as transmitter information indicating a transmitter, the facsimile machine 22 transmits a facsimile number of the facsimile machine 22 itself by a Transmitting Subscriber Identification (TSI) signal of a facsimile communication protocol prior to the transmission of the image data. Then, the facsimile machine 22 transmits the image data.

The Internet facsimile machine 24 transmits data including image data and transmission and reception information to the MFP 100 by electronic mail. Specifically, the Internet facsimile machine 24 attaches Tagged Image File Format (TIFF) or Portable Document Format (PDF) image data (image file) to electronic mail, and writes an electronic mail address of the Internet facsimile machine 24 itself as transmitter information in a header the electronic mail. Then, the Internet facsimile machine 24 transmits such electronic mail to the MFP 100. Further, the Internet facsimile machine 24 can also transmit electronic mail in which information relating to image data is written in the header of the electronic mail, other than the transmitter information.

Figure 3:
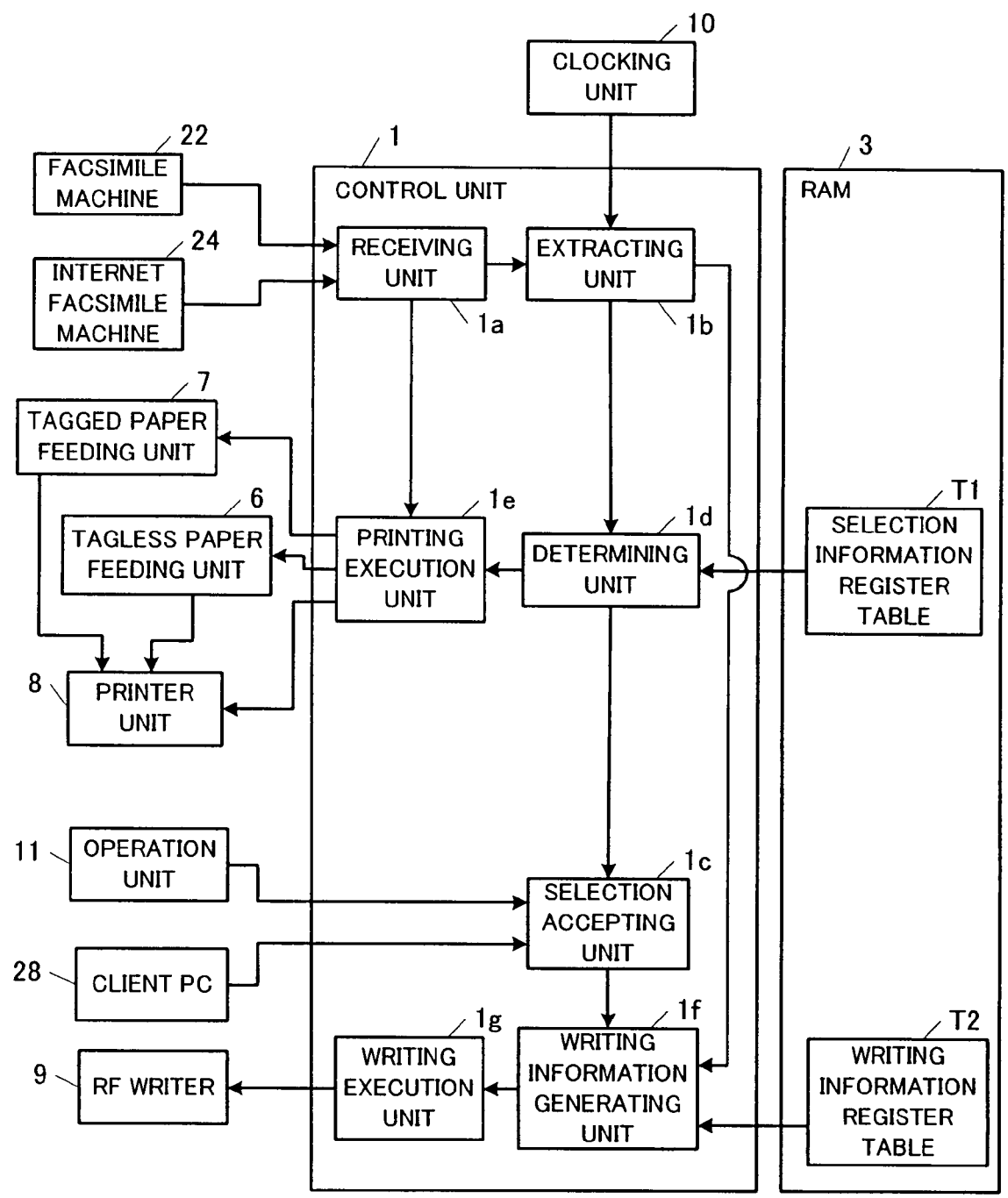
FIG. 3 is a functional block diagram of the MFP according to the first preferred embodiment of the present invention.

As illustrated in FIG. 3, which is a functional block diagram of the MFP 100, the control unit 1 of the MFP 100 functionally includes a receiving unit 1a, an extracting unit 1b, a selection accepting unit 1c, a determining unit 1d, a printing execution unit 1e, a writing information generating unit 1f, and a writing execution unit 1g. The RAM 3 of the MFP 100 stores the selection information register table T1 and the writing information register table T2. The control unit 1 retrieves and executes the control program previously stored in the ROM 2 to function as a function unit including the receiving unit 1a, the extracting unit 1b, the selection accepting unit 1c, the determining unit 1d, the printing execution unit 1e, the writing information generating unit 1f, and the writing execution unit 1g.

The receiving unit 1a receives image data, and data relating to the image data. Further, the data relating to the image data received by the receiving unit 1a includes transmitter information indicating a transmitter of the image data. Specifically, when receiving facsimile data from the facsimile machine 22, the receiving unit 1a receives a facsimile number of the facsimile machine 22 as the transmitter information by a TSI signal of the facsimile communication protocol, and then receives the image data. Further, although a standard function relating to the facsimile communication is defined by the ITU, a nonstandard function is also permitted to be set. The receiving unit 1a can also receive nonstandard information used for setting the nonstandard function from the facsimile machine 22. The nonstandard information is information that is effective only for transmission and reception with a specific model. The nonstandard information includes information relating to a confidential receiving function setting, information relating to a relay instruction and a broadcast instruction communication function setting, an identification number information indicating an identification number unique to the facsimile machine 22, and device type information indicating a model type of the facsimile machine 22. When receiving data from the Internet facsimile machine 24, the receiving unit 1a receives electronic mail attached with TIFF or PDF image data (image file) in which an electronic mail address of the Internet facsimile machine 24 is written in a header of such electronic mail as transmitter information. In addition to the electronic mail address of the Internet facsimile machine 24, the receiving unit 1a can also receive electronic mail in which information relating to the image data is written in a header of such electronic mail. For example, the information relating to the image data includes a file format of the image data, a print font, usage specifying information indicating to specify a usage of a printing paper on which an image based on the image data has been printed (for example, copy prohibited, transfer prohibited, and internal use only), a scanning mode for scanning a printing paper on which an image based on the image data has been printed, a transmission destination, a file property such as a font setting, a file name and a file format, a company name, a department name, a name of a creator, and information indicating a watermark or the like to be attached to a printing paper.

The extracting unit 1b extracts prescribed information from the data received by the receiving unit 1a. Specifically, the extracting unit 1b extracts transmitter information, i.e., a facsimile number or an electronic mail address of a transmitter, from the data from the facsimile machine 22 or the Internet facsimile machine 24 received by the receiving unit 1a. When nonstandard information is included in the data from the facsimile machine 22 received by the receiving unit 1a, or when information relating to the image data is included in the data from the Internet facsimile machine 24 received by the receiving unit 1a, the extracting unit 1b also extracts such information. The extracting unit 1b acquires from the clocking unit 10, date and time information indicating year, month, date and time when the receiving unit 1a received the data from the facsimile machine 22 or the Internet facsimile machine 24. Then, the extracting unit 1b extracts the acquired date and time information as reception time information.

The selection accepting unit 1c accepts a selection of whether or not to attach an RFID tag to a printing paper on which an image based on the received image data is to be printed and to output such a printing paper. Specifically, the selection accepting unit 1c accepts a selection by information entered via the operation unit 11 or the client PC 28.

The determining unit 1d determines a selection of whether or not to attach an RFID tag to a printing paper to which an image based on the received image data is to be printed and to output such paper. The determining unit 1d makes a determination according to the information extracted by the extracting unit 1b and the selection accepted by the selection accepting unit 1c. Specifically, the determining unit 1d searches and retrieves selection information corresponding to the transmitter information extracted by the extracting unit 1b from the selection information register table T1, and makes a determination according to the selection indicated by such selection information. Further, the selection information register table T1 is a selection registering unit that associates and registers the selection information and the transmitter information. For example, when the extracting unit 1b extracts a facsimile number (075-123-4567) of a transmitter as the transmitter information, the determining unit 1d searches selection information (tag necessary) corresponding to such a facsimile number from the selection information register table T1 illustrated in FIG. 4. Then, in accordance with the selection indicated by the selection information, the determining unit 1d determines to attach an RFID tag to the printing paper on which an image based on the received image data is to be printed and to output such printing paper. Further, when selection information corresponding to the transmitter information extracted by the extracting unit 1b cannot be detected from the selection information register table T1, the determining unit 1d determines not to attach an RFID tag to the printing paper on which an image based on the received image data is to be printed and not to output such printing paper. Then, when the selection based on the transmitter information extracted by the extracting unit 1b is a selection made to not attach an RFID tag to a printing paper on which an image based on the received image data is to be printed and not to output such printing paper, in case the selection accepting unit 1c accepts a selection to attach an RDIF tag to a printing paper and to output such printing paper, the determining unit 1d makes a determination according to the selection accepted by the selection accepting unit 1c. That is, the determining unit 1d preferentially determines the selection accepted by the selection accepting unit 1c than the selection based on the information extracted by the extracting unit 1b.

Further, the determining unit 1d may search whether or not the transmitter information extracted by the extracting unit 1b is stored in a storage portion (not illustrated) of the RAM 3. When the transmitter information extracted by the extracting unit 1b is stored in the storage portion of the RAM 3, the determining unit 1d may determine to attach an RFID tag to a printing paper on which an image based on the received image data is to be printed and to output such a printing paper. The determining unit 1d can also make a determination according to information other than the transmitter information extracted by the extracting unit 1b. For example, when the extracting unit 1b extracts information relating to a confidential receiving function setting, the determining unit 1d can make a determination to attach an RFID tag to a printing paper on which an image based on the received image data is to be printed and to output such a printing paper. Moreover, the determining unit 1d can preferentially determine the selection based on the information extracted by the extracting unit 1b than the selection accepted by the selection accepting unit 1c. That is, regardless of the selection accepted by the selection accepting unit 1c, the determining unit 1d can make a determination according to the selection based on the information extracted by the extracting unit 1b.

The printing execution unit (printer unit and paper feeding unit) 1e prints an image onto printing paper according to the image data received by the receiving unit 1a. Specifically, the printing execution unit 1e feeds a printing paper from the tagless paper feeding unit 6 or the tagged paper feeding unit 7 to the printer unit 8. Then, the printing execution unit 1e decodes image data, which has been received by the receiving unit 1a and stored in the image memory 12, by the CODEC 4.

Then, the printing execution unit 1e prints an image onto the printing paper by the printer unit 8 according to the decoded image data. When the determining unit 1d determines not to attach an RFID tag to the printing paper on which an image based on the received image data is to be printed and not to output such a printing paper, the printing execution unit 1e feeds an appropriate sized tagless paper to the printer unit 8 from the tagless paper feeding unit 6. Meanwhile, when the determining unit 1d determines to attach an RFID tag to the printing paper on which an image based on the received image data is to be printed and to output such a printing paper, the printing execution unit 1e feeds an appropriate sized tagged paper to the printer unit 8 from the tagged paper feeding unit 7.

The writing information generating unit (generating unit) 1f generates information to be written into a storage medium of the RFID tag (hereinafter referred to as "writing information") in accordance with the information extracted by the extracting unit 1b. Specifically, the writing information generating unit 1f generates the writing information by searching and retrieving writing information, which corresponds to the transmitter information extracted by the extracting unit 1b, from the writing information register table T2. Further, the writing information register table T2 associates and stores the writing information and the transmitter information. For example, when the extracting unit 1b extracts the facsimile number (01-234-5678) of the transmitter as the transmitter information, the writing information generating unit if searches and retrieves the writing information (a company name, or a department name "Development Dept.", usage specifying information "copy prohibited") corresponding to the extracted facsimile number from the writing information register table T2 illustrated in FIG. 5. Then, the writing information generating unit if generates the transmitter information extracted by the extracting unit 1b, the reception time information and also the information retrieved from the writing information register table T2 as the writing information.

Further, the writing information generating unit 1f can generate all or a prescribed portion of the information extracted by the extracting unit 1b as the writing information. The writing information generating unit 1f can also generate the writing information according to information other than the transmitter information extracted by the extracting unit 1b. For example, when the extracting unit 1b extracts information relating to the confidential receiving function setting, the writing information generating unit 1f can generate information indicating "copy prohibited" as the writing information.

The writing execution unit (writing unit) 1g writes the writing information generated by the writing information generating unit 1f into the storage medium of the RFID tag, which is attached to the printing paper on which an image has been printed according to the image data relating to the writing information, by the RF writer 9.

As illustrated in FIG. 4, the selection information register table (selection registering unit) T1 associates and stores selection information and the transmitter information. For example, the transmitter information is a facsimile number or an electronic mail address indicating a transmitter. For example, the selection information is information indicating a selection of whether or not to attach an RFID tag to a printing paper on which an image based on the received image data is to be printed and to output such a printing paper. The selection information is either "tag necessary" or "tag unnecessary". Further, a one-touch dial registered number or a speed-dial number may be associated with transmitter information and registered. In accordance with the information entered from the operation unit 11 or the client PC 28, changes can be made to the information registered in the selection information register table T1.

As illustrated in FIG. 5, the writing information register table T2 associates and stores the writing information and the transmitter information. For example, the writing information is information to be written into the RFID tag of the printing paper on which an image based on the received image data is to be printed. For example, the writing information is transmitter name information, usage specifying information, and transmission destination information. Further, the transmitter name information indicates a name of a transmitter, e.g. a "company name", a "department name", or a "name of creator", etc. The usage specifying information specifies a usage of a printing paper on which an image such as "copy prohibited", "transfer prohibited" and "internal use only", etc. is printed. The transmission destination information indicates a "facsimile number" or a "mail address" of a transmission destination. In accordance with information entered from the operation unit 11 or the client PC 28, changes can be made to the information registered in the writing information register table T2.

Further, among the information extracted by the extracting unit 1b, the writing information register table T2 can designate to generate which information as the writing information. For example, when the extracting unit 1b extracts specific transmitter information, the writing information register table T2 may designate only transmitter information, usage specifying information, reception time information, and information indicating a "file name" as the writing information. When specific information is extracted by the extracting unit 1b, the writing information register table T2 may designate information to be generated as the writing information by being associated with the extracted information. For example, when the extracting unit 1b extracts "information relating to confidential receiving function setting", the writing information register table T2 may designate information indicating "copy prohibited" as the writing information.

Figure 6:
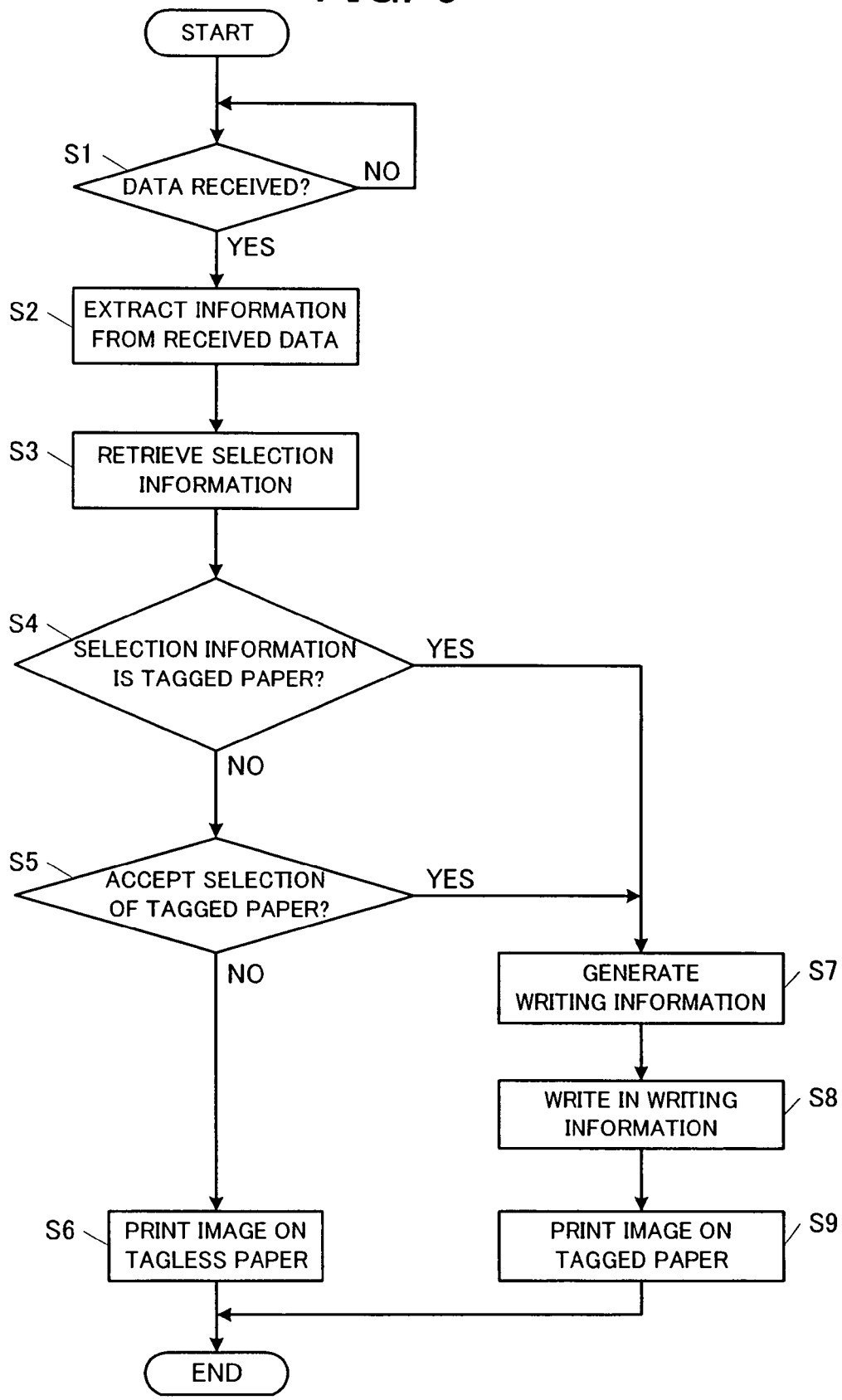
FIG. 6 is a flowchart illustrating a processing operation carried out by an MFP when receiving data.

In the following, with reference to the flowchart of FIG. 6, a description will be made of a processing operation carried out by the MFP 100 when receiving data from the facsimile machine 22 or the Internet facsimile machine 24. Further, data received from the facsimile machine 22 is specifically facsimile data, and data received from the Internet facsimile machine 24 is specifically electronic mail.

First, the receiving unit 1a of the MFP 100 determines whether or not data has been received (step S1). Specifically, the receiving unit 1a determines whether or not facsimile data has been received from the facsimile machine 22 via the NCU 14, or whether or not electronic mail attached with image data has been received from the Internet facsimile machine 24 via the LAN I/F 15. When a determination is made that data has not been received (step S1: NO), the MFP 100 is placed under a standby state. Meanwhile, when a determination is made that data has been received (step S1: YES), the extracting unit 1b extracts information from the data received by the receiving unit 1a (step S2). Specifically, when the receiving unit 1a has received facsimile data, the extracting unit 1b extracts a facsimile number of the facsimile machine 22, which is a transmitter of the facsimile data. When the receiving unit 1a has received electronic mail, the extracting unit 1b extracts an electronic mail address of the Internet facsimile machine 24, which is a transmitter of the electronic mail. In addition, the extracting unit 1b also extracts reception time information indicating year, month, date, and time when the receiving unit 1a received the data. When the receiving unit 1a has received facsimile data, the extracting unit 1b extracts nonstandard information received by the receiving unit 1a. When the receiving unit 1a has received electronic mail, the extracting unit 1b extracts various pieces of information written in a header of the electronic mail.

Next, the determining unit 1d retrieves from the selection information register table T1, selection information corresponding to the transmitter information extracted by the extracting unit 1b (step S3). When the transmitter information extracted by the extracting unit 1b is not stored in the selection information register table T1, the selection information corresponding to the transmitter information is assumed to be information indicating to print onto a tagless paper.

In accordance with the selection information retrieved from the selection information register table T1, the determining unit id determines whether or not the printing paper to which an image is to be printed according to the image data received by the receiving unit 1a is tagged paper (step S4). When the retrieved selection information is "tag necessary" indicating to print onto tagged paper (step S4: YES), the printing execution unit 1e feeds a prescribed sized tagged paper from the tagged paper feeding unit 7 towards the printer unit 8. Meanwhile, when the retrieved selection information is "tag unnecessary" indicating to print onto tagless paper (step S4: NO), the determining unit 1d determines whether or not the selection accepting unit 1c has accepted a selection to print onto a tagged paper (step S5). When a determination is made that the selection accepting unit 1c has accepted a selection for printing onto a tagged paper (step S5: YES), the printing execution unit 1e feeds a prescribed sized tagged paper from the tagged paper feeding unit 7 towards the printer unit 8. Meanwhile, when a determination is made that the selection accepting unit 1c has not accepted a selection for printing onto a tagged paper (step S5: NO), the printing execution unit 1e feeds a prescribed sized tagless paper from the tagless paper feeding unit 6 to the printer unit 8. Then, the printing execution unit 1e prints an image onto a tagless paper by the printer unit 8 according to the image data received by the receiving unit 1a, and outputs the printed tagless paper (step S6).

When printing onto a tagged paper (step S4: YES or step S5: YES), in accordance with the information extracted by the extracting unit 1b, the writing information generating unit 1f generates writing information to be written into the storage medium of the RFID tag attached to the printing paper (step S7). The writing execution unit 1g writes the writing information generated by the writing information generation unit 1f into the storage medium of the RFID tag attached to the tagged paper fed from the tagged paper feeding unit 7 by the RF writer 9 (step S8). The printing execution unit 1e prints an image based on the image data received by the receiving unit 1a onto a tagged paper, and outputs the printed paper (step S9).

Further, when a prescribed sized tagless paper or tagged paper to be fed to the printer unit 8 is not accommodated in the paper feeding cassettes 101a through 101d, such a fact may be notified by a notification unit. The notification by the notification unit may be carried out by displaying a message on the LCD of the display unit 12. As the notification unit, a speaker (not illustrated) or the like may also be used. In this case, for example, when A4-sized tagged paper to be printed with an image is not accommodated, an image may be printed on an A4-sized tagless paper and such a fact may be recorded on the tagless paper as a background image such as a watermark. Alternatively, the image may not be printed on the printing paper. As another example, an RF reader may be provided as a detection unit for detecting whether or not a tagged paper is accommodated in the paper feeding cassettes 101a and 101b. The RF reader may issue a calling signal, and an RFID tag may return a response signal to the calling signal. Then, when the RF reader receives the response signal, a determination may be made that the RFID tag is attached to the printing paper.

Figure 7:
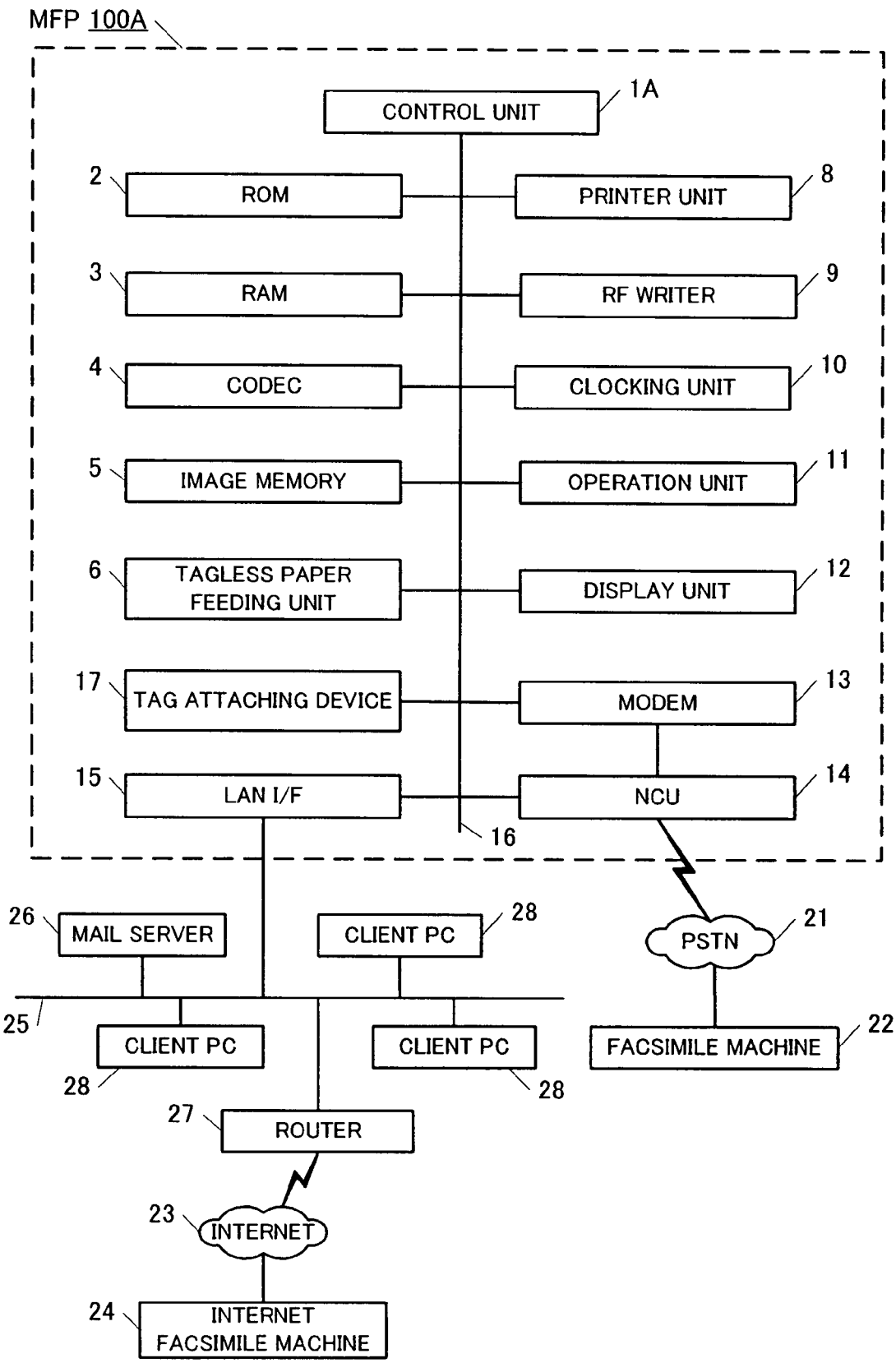
FIG. 7 is a block diagram illustrating an example of a configuration of an MFP according to a second preferred embodiment of the present invention.

Next, a description will be made of an MFP 100A including a communication terminal device according to a second preferred embodiment of the present invention. As illustrated in the block diagram of FIG. 7, the MFP 100A includes a control unit 1A and a tag attaching device 17 in place of the control unit 1 and the tagged paper feeding unit 7 of the MFP 100.

Figure 8:
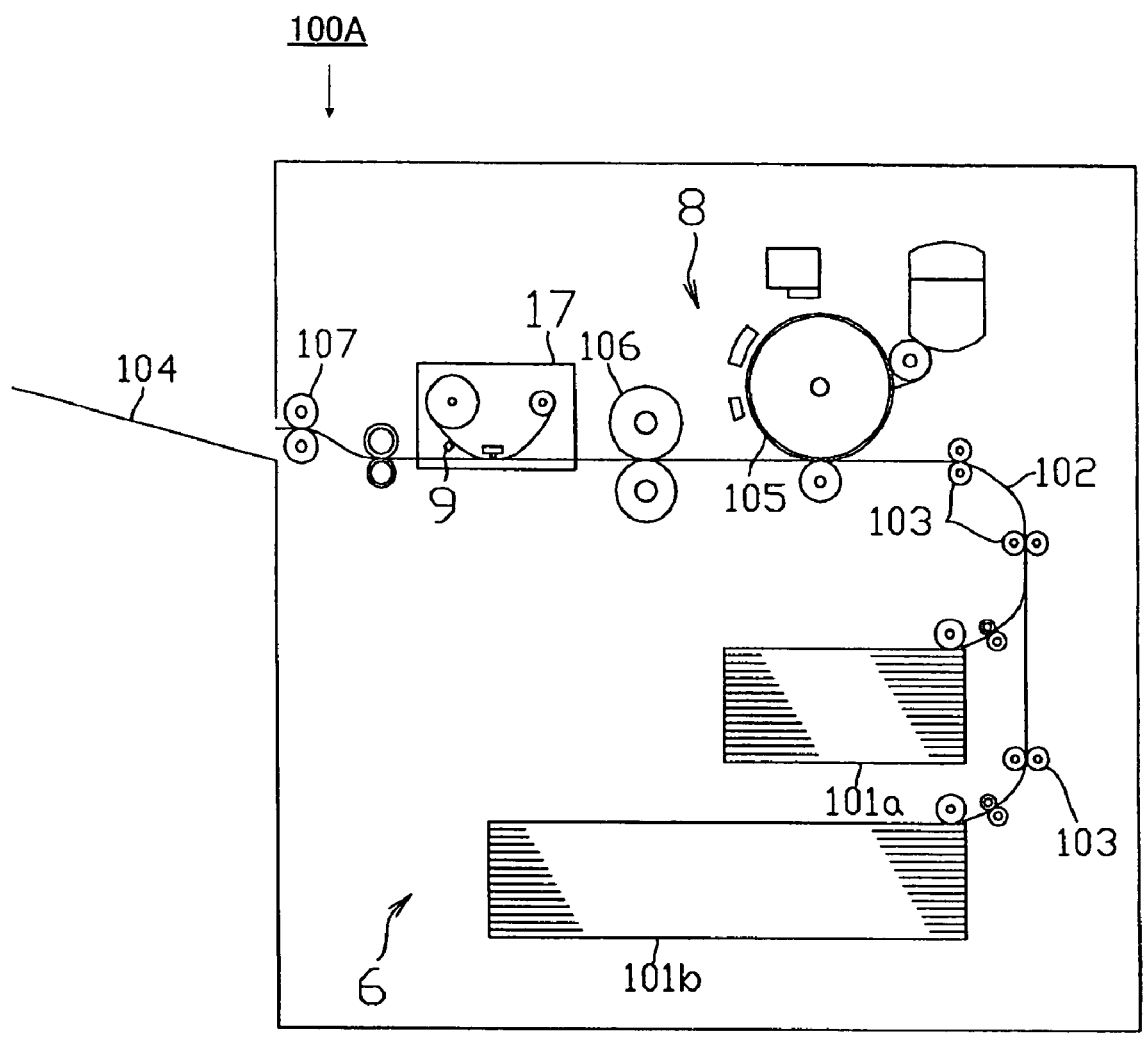
FIG. 8 is a schematic cross-sectional view of an upper portion of the MFP according to the second preferred embodiment of the present invention.

As illustrated in FIG. 8, the tag attaching device 17 attaches an RFID tag to a printing paper. In the present preferred embodiment, the tag attaching device 17 coats an adhesive on a paper slip or a film on which an RFID tag has been previously attached, and presses and attaches the paper slip or the film attached with the RFID tag onto a printing paper on which an image has been printed by the printer unit 8. As another example, the RFID tag may be attached onto a printing paper before an image is printed by the printer unit 8. Alternatively, the paper slip or the film to which the RFID tag has been previously attached may be fixed onto a printing paper by a stapler or the like. A method for attaching the RFID tag is not limited in particular. Before attaching the RFID tag onto a printing paper, the writing information relating to the image printed on the printing paper may be previously written into the storage portion of the RFID tag by the RF writer 9. Further, the writing information may be written into the storage portion of the RFID tag, which is attached to the printing paper, by the RF writer 9.

The MFP 100A accommodates prescribed sized tagless papers in the paper feeding cassettes 101a and 101b. The tagless paper feeding unit 6 picks up a tagless paper from the paper feeding cassette 101a or the paper feeding cassette 101b and feeds the prescribed sized tagless paper to the printer unit 8.

Figure 9:
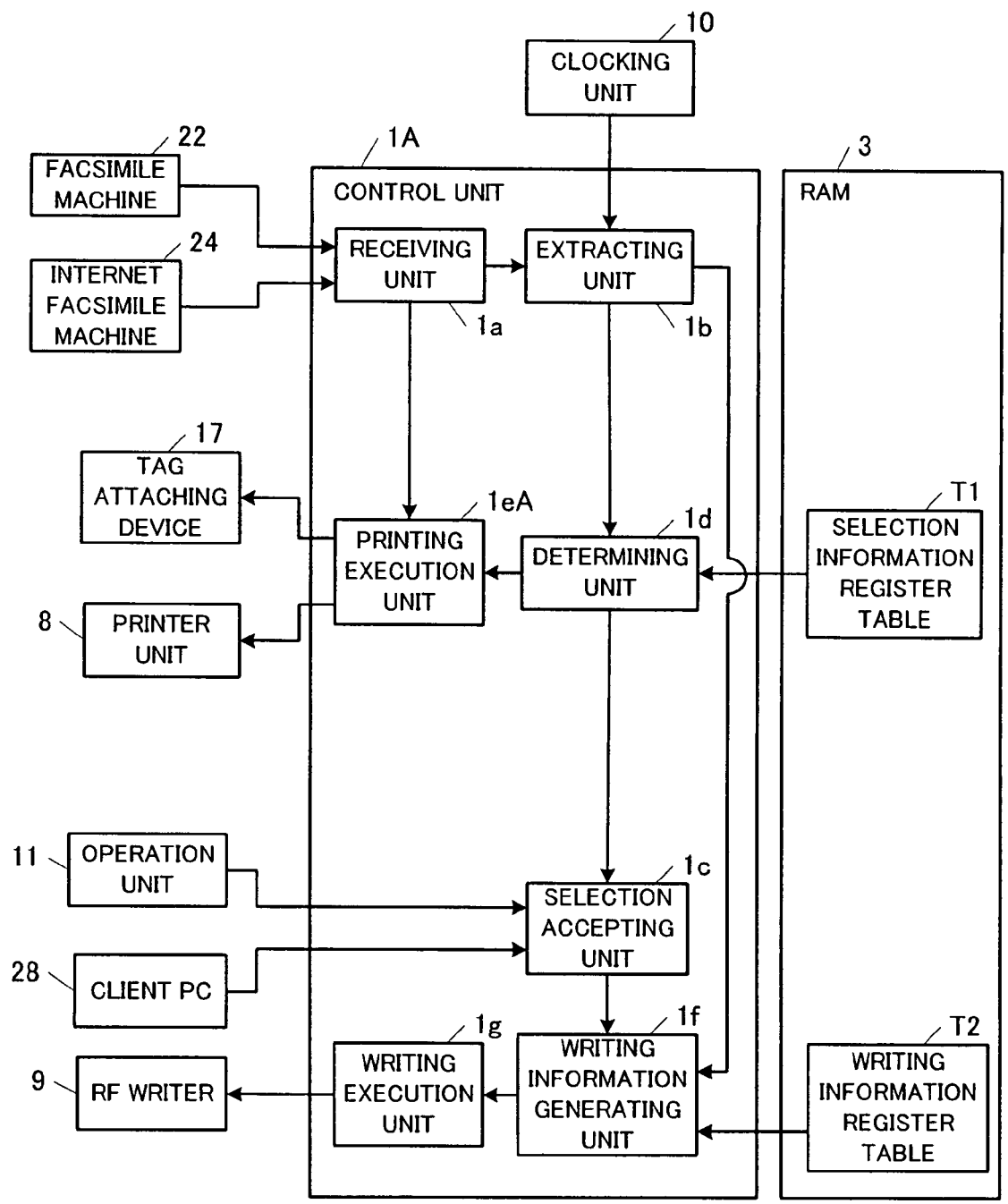
FIG. 9 is a functional block diagram of the MFP according to the second preferred embodiment of the present invention.

When comparing with the control unit 1 of the MFP 100 according to the first preferred embodiment, the control unit 1A of the MFP 100A according to the second preferred embodiment includes a printing execution unit 1eA in place of the printing execution unit 1e as illustrated in FIG. 9, which is the functional block diagram of the MFP 100A.

The printing execution unit (printer unit, and paper feeding unit) 1eA prints an image onto a printing paper according to the image data received by the receiving unit 1a. Specifically, the printing execution unit 1eA decodes image data, which has been received by the receiving unit 1a and stored in the image memory 12, by the CODEC 4. Then, the printing execution unit 1eA prints an image based on the decoded image data by the printer unit 8. When the determining unit 1d determines to attach an RFID tag to the printing paper on which an image based on the received image data is to be printed and to output such printing paper, the printing execution unit 1eA attaches the RFID tag to the tagless paper fed from the tagless paper feeding unit 6 by the tag attaching device 17.

Next, with reference to the flowchart of FIG. 6, a description will be made of a processing operation carried out by the MFP 100A when receiving data from the facsimile machine 22 or the Internet facsimile machine 24.

First, the receiving unit 1a of the MFP 100A determines whether or not data has been received (step S1). When a determination is made that data has not been received (step S1: NO), the MFP 100A is placed under a standby state. When a determination is made that data has been received (step S1: YES), the extracting unit 1b extracts information from the data received by the receiving unit 1*a* (step S2). Next, the determining unit 1*d* retrieves selection information corresponding to transmitter information, which has been extracted by the extracting unit 1*b*, from the selection information register table T1 (step S3).

Then, according to the selection information retrieved from the selection information register table T1, the determining unit 1*d* determines whether or not the printing paper for printing an image according to the image data received by the receiving unit 1*a* is a tagged paper (step S4). When the retrieved selection information is "tag unnecessary" indicating to print onto a tagless paper (step S4: NO), the determining unit 1*d* determines whether or not the selection accepting unit 1*c* has accepted the selection for printing onto a tagged paper (step S5). When a determination is made that the selection accepting unit 1*c* has not accepted a selection for printing onto a tagged paper (step S5: NO), a prescribed sized printing paper is fed to the printer unit 8 from the tagless paper feeding unit 6. The printing execution unit 1*eA* prints an image onto a tagless paper by the printer unit 8 according to the image data received by the receiving unit 1*a*, and outputs the printed printing paper (step S6).

Meanwhile, when a determination is made that the retrieved selection information is "tag necessary" indicating to print onto a tagged paper (step S4: YES), or when a determination is made that the selection accepting unit 1*c* has accepted a selection for printing onto a tagged paper (step S5: YES), in accordance with the information extracted by the extracting unit 1*b*, the writing information generating unit 1*f* generates writing information to be written into the storage medium of the RFID tag to be attached to the printing paper (step S7). The writing execution unit 1*g* writes the writing information generated by the writing information generating unit 1*f* into the storage medium of the RFID tag by the RF writer 9 (step S8). Then, prescribed sized printing paper is fed to the printer unit 8 by the tagless paper feeding unit 6. The printing execution unit 1*eA* prints an image onto a tagless paper by the printer unit 8 according to the image data received by the receiving unit 1*a*. Then, the tag attaching device 17 attaches an RFID tag, in which the writing information is written in the storage portion, to the tagless paper on which an image has been printed, and the printing execution unit 1*eA* outputs the printing paper (step S9).

Further, when an RFID tag to be attached by the tag attaching unit 17 runs out, a notification unit may notify such a fact. The notification by the notification unit may be carried out by displaying a message on the LCD of the display unit 12. As the notification unit, a speaker (not illustrated) or the like may also be used. Also in this case, when an image should be printed onto a tagged paper, an image may be printed onto a tagless paper, and such a fact may be printed onto the tagless paper as a background image by a watermark or the like. Alternatively, the image may not be printed on the printing paper.

As described above, according to the MFP 100 and the MFP 100A, a selection on whether or not to attach an RFID tag to the printing paper on which an image based on the received image data has been printed and to output such a printing paper is determined according to the transmitter of the image data. Therefore, even when data directly indicating the selection is not included in the received data, an RFID tag is attached to the printing paper on which an image is to be printed according to the transmitter, and the printing paper attached with the RFID tag is output. Therefore, an RFID tag is reliably attached to the printing paper on which an image has been printed according to the image data received from a specific transmitter, and such printing paper is output. In addition, usage specifying information corresponding to the transmitter information or the like can be written into the storage portion of the RFID tag of the printing paper. Therefore, an identity relating to the image of the printing paper can be clarified, and an appropriate usage and management can be reliably carried out with respect to the printing paper. As a result, unauthorized usage of image data, such as leakage, illegal falsification and illegal copying of image information, can be prevented, and level of information security can be increased.

According to the above-described MFP 100 and the MFP 100A, in accordance with the transmitter information or the nonstandard information or the like included in the received facsimile data, a determination is made on the selection of whether or not to attach an RFID tag to the printing paper on which an image based on the received facsimile data has been printed, and to output the printing paper. Furthermore, usage specifying information corresponding to the transmitter information or the nonstandard information or the like included in the received facsimile data can be written into the storage portion of the RFID tag of the printing paper. As a result, an appropriate usage and management can be carried out reliably with respect to the printing paper.

According to the MFP 100 and the MFP 100A, a selection can be accepted from the outside regarding whether or not to attach an RFID tag to the printing paper on which an image based on the received image data has been printed and to output such printing paper. Therefore, an appropriate usage and management with respect to the printing paper can be reliably carried out according to a demand from the outside.

Further, the configuration of the MFPs 100 and 100A illustrated in the preferred embodiments is just one of the examples of the communication terminal device of the present invention, and various modifications may be made without departing from the scope of the present invention. For example, the communication terminal device may include a stamping unit such as a rubber stamp for placing a stamp of a prescribed "company logo" or "copy prohibited" or the like onto the printing paper according to the transmitter information, the usage specifying information or the like. The printer unit 8 may print the received image data onto the printing paper, and according to the transmitter information, the usage specifying information, the reception time information or the like, the printer unit 8 may also print a prescribed "company logo", "copy prohibited" and "reception time" or the like onto the printing paper as a background image such as a visible watermark or a header image.

In the above-described preferred embodiments, the communication terminal device has been described as the MFP 100 and the MFP 100A. However, the communication terminal device is not limited to the MFP 100 and the MFP 100A. For example, the communication terminal device may be a copier, a facsimile machine, a scanner, or an MFP including a copier function, a facsimile function and a scanner function.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A communication terminal device comprising:
a receiving means for receiving data;
a printing means for printing an image onto a printing paper according to the data received by the receiving means;

a registering means for registering a selection of whether or not to attach a storage medium, in which information can be electronically written, to the printing paper and to output the printing paper, by associating the selection with prescribed information;

an extracting means for extracting the prescribed information from the data received by the receiving means or data acquired in relation with transmission and reception of the data; and a determining means for determining whether or not to attach the storage medium to the printing paper according to the selection registered in the registering means by being associated with the prescribed information extracted by the extracting means.

2. The communication terminal device according to claim 1, wherein the receiving means receives facsimile data.

3. The communication terminal device according to claim 1, wherein the prescribed information is transmitter information indicating a transmitter of the data received by the receiving means.

4. The communication terminal device according to claim 1, further comprising an accepting means for accepting the selection, wherein the determining means preferentially determines the selection accepted by the accepting means.

5. The communication terminal device according to claim 4, further comprising a presenting means for presenting the information extracted by the extracting means, wherein the accepting means can refer to the information presented by the presenting means and enter the selection.

6. The communication terminal device according to claim 1, further comprising a writing means for writing information into the storage medium.

7. The communication terminal device according to claim 6, wherein the writing means writes into the storage medium, information extracted from the data received by the receiving means or data acquired in relation with transmission and reception of the data.

8. The communication terminal device according to claim 6, further comprising a generating means for generating information relating to specification of usage of the printing paper printed with the image according to the information extracted by the extracting means, wherein the writing means writes the information generated by the generating means into the storage medium.

9. The communication terminal device according to claim 1, further comprising:

means for feeding printing paper attached with a storage medium, in which information can be electronically written; and means for feeding printing paper not attached with a storage medium, in which information can be electronically written, wherein in accordance with determination made by the determining means, the means for feeding the printing paper attached with the storage medium or the means for feeding the printing paper not attached with the storage medium feeds the printing paper to the printing means.

10. The communication terminal device according to claim 1, further comprising:

means for feeding printing paper not attached with a storage medium, in which information can be electronically written; and an attaching means for attaching a storage medium, in which information can be electronically written, to the printing paper, wherein when the determining means determines to attach the storage medium, the attaching means attaches the storage medium to the printing paper fed from the means for feeding to the printing means.

11. The communication terminal device according to claim 1, further comprising stamping means, when the determining means determines to attach the storage medium, a stamp indicating that the storage medium is attached to the printing paper.

12. A communication method comprising the steps of:

receiving data;

registering a selection of whether or not to attach a storage medium, in which information can be electronically written, to a printing paper and to output the printing paper, by associating the selection with prescribed information;

extracting the prescribed information from the data received at the receiving step or data acquired in relation with transmission and reception of the data;

determining whether or not to attach a storage medium in accordance with the selection registered at the registering step by being associated with the prescribed information extracted at the extracting step; and printing an image onto printing paper according to the data received at the receiving step, when a determination is made at the determining step to attach the storage medium, by feeding a printing paper attached with a storage medium, in which information can be electronically written, and when a determination is made at the determining step to not attach the storage medium, by feeding a printing paper not attached with a storage medium, in which information can be electronically written;

the determining step to attach the storage medium, by feeding a printing paper attached with a storage medium, in which information can be electronically written, and when a determination is made at the determining step to not attach the storage medium, by feeding a printing paper not attached with a storage medium, in which information can be electronically written.

13. The communication method according to claim 12, wherein at the receiving step, facsimile data is received.

14. The communication method according to claim 12, wherein the prescribed information is transmitter information indicating a transmitter of the data received at the receiving step.

15. The communication method according to claim 12, further comprising the step of accepting the selection, wherein at the determining step, the selection accepted at the accepting step is preferentially determined.

16. The communication method according to claim 12, further comprising the step of writing information into the storage medium.

17. The communication method according to claim 16, wherein at the writing step, information extracted from the data received at the receiving step or data acquired in relation with transmission and reception of the data is written into the storage medium.

18. The communication method according to claim 16, further comprising the step of generating information relating to specification of usage of the printing paper printed with the image, according to the information extracted at the extracting step, wherein at the writing step, the information generated at the generating step is written into the storage medium.

19. The communication method according to claim 12, further comprising the step of stamping, when a determination is made at the determining step to attach the storage medium to the printing paper on which the image has been printed and to output the printing paper, a stamp to the printing paper to indicate that the storage medium is attached.

20. A communication method comprising the steps of:
   receiving data;
   printing an image onto a printing paper according to the data received at the receiving step;
   registering a selection of whether or not to attach a storage medium, in which information can be electronically written, to a printing paper and to output the printing paper, by associating the selection with prescribed information;
   extracting the prescribed information from the data received at the receiving step or data acquired in relation with transmission and reception of the data;
   determining whether or not to attach the storage medium according to the selection registered at the registering step by being associated with the prescribed information extracted at the extracting step; and
   attaching the storage medium, in which information can be electronically written, to a printing paper to be supplied to a printing means when the storage medium is determined to be attached at the determining step.

* * * * *